Feb. 6, 1968  R. L. UPHOFF  3,367,173
DEVICE FOR SONIC AND ULTRASONIC INTERNAL SCANNING OF
SOLID AND FLUID MEDIA
Filed Feb. 21, 1964  3 Sheets-Sheet 1

LEGEND
$f_2 \neq f_1$
$f_2 \neq nf_1$
$nf_2 \neq f_1$
n = any integer

INVENTOR.
Russel L. Uphoff
by [signature]
ATTORNEY.

INVENTOR.
Russel L. Uphoff

United States Patent Office 3,367,173
Patented Feb. 6, 1968

3,367,173
DEVICE FOR SONIC AND ULTRASONIC INTERNAL SCANNING OF SOLID AND FLUID MEDIA
Russel L. Uphoff, Stamford, Conn. (% Haffrel Instruments, Inc., 53 Water St., South Norwalk, Conn. 06854)
Filed Feb. 21, 1964, Ser. No. 346,427
19 Claims. (Cl. 73—67.8)

This invention relates to devices for examining the interiors of solid and fluid media by means of mechanical vibrations or waves at sonic and ultrasonic frequencies.

Equipment utilizing pulsed ultrasonic energy such as described in U.S. Patents 2,280,226 and 2,398,701 has been used extensively to detect and locate flaws in metal bodies of relatively simple geometry. These simple flaw detectors proved to be of limited usefulness in exploring the interiors of more complex structures. In particular, in the medical field the multiplicity of reflecting interfaces, as well as the complexity of most biological structures, have limited the application of simple ultrasonic pulse echo equipment to a very few highly specialized applications.

One method employing two dimensional echography, has been described by Wild and Reid, Science, vol. 115, p. 226, 1952. This method can be used to analyze complex anatomical structures. In applying their technique Wild and Reid use the signals reflected from tissue interfaces to intensity modulate the beam of a cathode ray tube, strong signals appearing as bright spots and weak signals as dim spots. Unfortunately one of the weaknesses of the technique is that the range of signals which can be displayed is limited by the characteristics of the tube phosphor to ten to fifteen db. Signals below this range will disappear while signals above this range will cause the spot to "bloom" or defocus. To prevent the latter possibility peak limiting circuits are often used which tend to reduce all reflected signals, no matter how strong, to the same amplitude. The result of this, in either case, is that echograms obtained by this procedure tend to be black and white pictures in which most if not all of this amplitude information is lost. It is desirable to preserve in the echogram a very wide range of amplitude information, possibly as much as 80 db. This invention describes means for accomplishing this end.

The reflected signals received back from the tissue vary over a wide range of amplitudes. The amount of energy reflected at an interface varies with the mismatch in sonic and ultrasonic impedance across the interface. Thus the mismatch at a tissue-air interface or a muscle-bone interface is large causing a high amplitude reflected signal while signals from fiber interfaces in homogeneous tissues are extremely small, as much as 60 db less. In order to properly delineate tissue, both signals should be presented on the echogram without losing the very important differentiation in their amplitude. Another reason for the wide variation in signal amplitude is the variation with the angle with which the interface intercepts the sound beam. Tests with very smooth surfaces indicate that the signal from a surface at 75° to the beam is 60 db below the same surface at 90° to the beam. Again it is desirable that interfaces be presented on the echogram regardless of their angle with respect to the sound beam.

It is the principal object of this invention to provide a means of displaying in an echogram a wide dynamic range of signals without losing the ability to differentiate between strong and weak signals and in spite of inherent limitations in the cathode ray tube or other read-out device. This object is accomplished by varying the sensitivity of the receiving system in a cyclic manner *not* at the same frequency as the pulse recurrence frequency. Alternatively the pulse power may be varied in a cyclic manner. In either case the cyclic frequency should be chosen so that all portions of the picture are viewed at both high and low gain. In addition for best picture quality the gain variation frequency should be chosen so that the gain variations are not readily visible as striations in the echogram.

As a further alternative the sensitivity of the system may be varied in a completely non-cyclic manner i.e., randomly. This may be done, for example, with a random noise generator provided of course, that the frequency components emanating from the noise generator do not include the sonic or ultrasonic spectrum which is being amplified by the receiver-amplifier of the equipment.

For the purposes of this patent application the term "echogram" shall be deemed to include all echo pictures, displayed or recorded on any suitable media, such as light sensitive paper, electro-sensitive material, memory tubes and cathode ray tubes.

Figure 1:
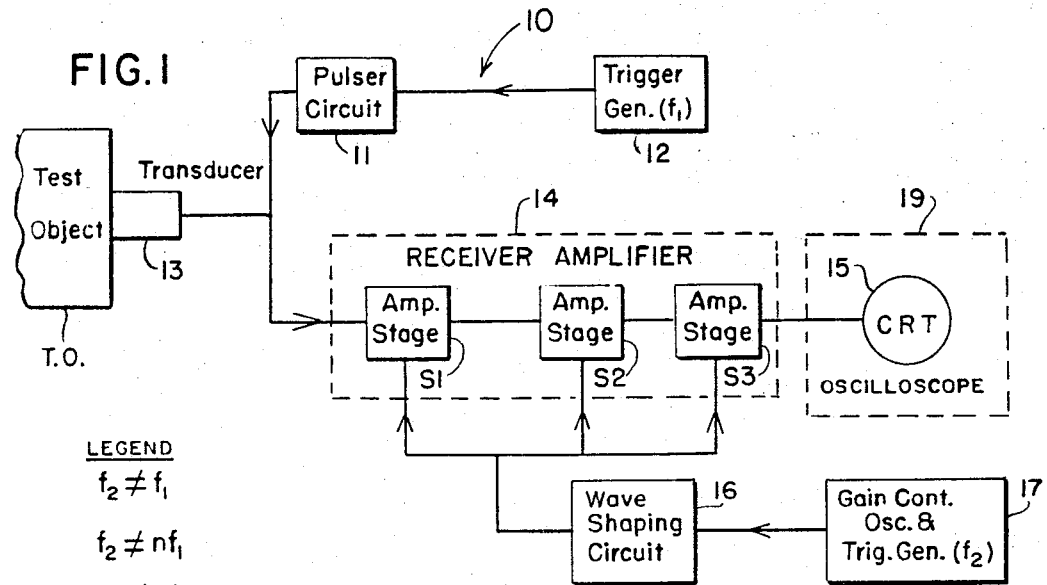
FIGURE 1 is a block diagram of a system embodying one form of the invention.

Referring first to FIGURE 1, there is shown a system 10 including pulser circuit 11 actuated by a trigger generator 12. The circuit 10 applies electrical pulses at a predetermined pulse recurrence frequency (PRF)$f_1$ to a transducer 13. This transducer may include a ceramic piezo-electric element which applies mechanical pulses at frequency $f_1$ to a test object T.O. This test object may be a part of a human or animal body, or any solid inanimate body, or any fluid body. Circuit 11 and transducer 13 are both connected to a receiver amplifier 14. The output of the amplifier is connected to the grid or cathode of a cathode ray tube 15 of an oscilloscope 19. This provides an intensity modulated visual display of the electrical pulse output of the receiver.

The transducer is then physically moved over the surface of the test object and the time base on the CRT is made to move over the display surface of the CRT in a manner which is physically analogous to the path of the sound beam in the test object. This is done by coupling suitable data potentiometers to the transducer and using these potentiometers to develop deflection voltages for application to the deflection plates of the CRT. A time exposure photograph of the CRT display taken during the entire scanning process will then produce two dimensional echograms of the test object T.O.

A gain control oscillator and trigger generator 17 generates pulses at a frequency $f_2$ which is other than frequency $f_1$ as indicated by the legend of FIGURE 1. The output of the generator is applied to a wave shaping circuit 16 having an output which can be divided and applied to a plurality of amplifier stages S1–S3 in the receiving amplifier to effect gain variation.

System 10 is an asynchronous system in that the gain control oscillator 17 is not controlled by or keyed to the trigger generator 12 which determines the pulse recurrence frequency (PRF) $f_1$. It is important to note that the gain control frequency $f_2$ is not a multiple or sub-multiple of the PRF. Depending on the requirements of the readout device the gain control frequency may for example be as low as a tenth of a cycle per second or as high as 10,000 cycles per second, or even beyond this range at either end.

The wave shaping circuit 16 generates the actual gain control wave-form. Many different wave shapes could be used depending on the characteristics of the readout device 15. The output of the wave shaper 16 is the gain control voltage which is fed to receiver amplifier 14 where it is used to control the receiver gain of one or more stages S1–S3. The actual gain control may be by one of several methods well known in the electronic art, for example, it may be fed to the grids of remote cutoff amplifier tubes.

Figure 2:
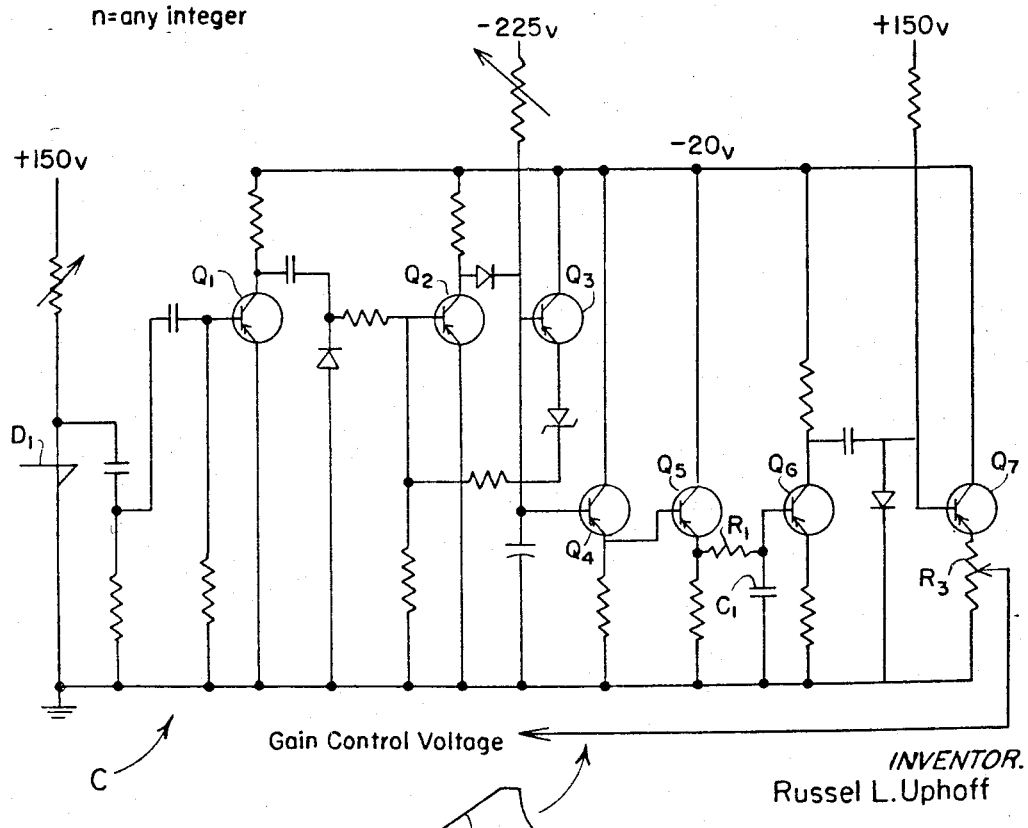
FIGURE 2 is a detailed schematic diagram of a circuit used in the system of FIGURE 1.

FIGURE 2 shows a circuit diagram C for parts of the system described. $D_1$ is a four layer diode employed in a well known trigger generator circuit. The frequency range is 2 to 100 p.p.s. Transistor $Q_1$ is a trigger amplifier. Transistors $Q_2$ and $Q_3$ are arranged in a well known triangular wave generating circuit. Transistor $Q_2$ is a bistable transistor known by the trade name "Thyristor." Transistors $Q_4$ and $Q_5$ are employed in impedance matching (emitter follower) stages to prevent loading of the triangular wave generator. Resistor $R_1$ and capacitor $C_1$ form an integrating circuit which removes high frequency components from the waveform to obviate the possibility of feeding interfering voltages into the receiver amplifier 14. Transistor $Q_6$ is employed in a phase reversing stage and transistor $Q_7$ is an emitter follower to provide a low impedance output. The waveform W appearing at the output is diagrammed in FIGURE 3. This waveform is fed to the grids of remote cut off pentode amplifier tubes in stages S1–S3 of the receiver. The amount of the cyclic gain control voltage available can be varied by adjusting the potentiometer $R_3$ in circuit C.

Figure 3:
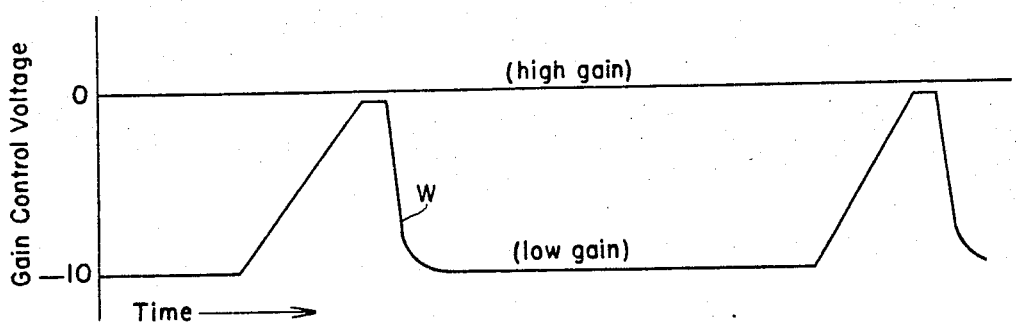
FIGURE 3 is a graphic diagram of a gain control wave-form generated by the circuit of FIGURE 2.

The waveform W of FIGURE 3 can be generated by other circuits known to the electronic art. Circuit C of FIGURE 2 is provided as an example of a suitable circuit.

The effect of the application of the gain control voltage to the amplifier 14 is to keep the amplifier gain at a low value from 60 to 90% of the cycle. During this time only high level signals appears on the screen of cathode ray tube 15. During the remainder of the cycle the gain is increased by the triangular waveform W shown in FIGURE 3. As the gain is increased, more and more of the weaker signals appear on the screen. If the echogram is being produced on photographic film the strong echoes will produce completely white images since they appear on the cathode ray tube 15. 100% of the time. On the other hand weaker signals will produce images of lesser intensity since they appear on the screen of tube 15 a smaller proportion of the time. Because of the triangular waveshape this effect is more pronounced the weaker the echoes are.

Figure 4:
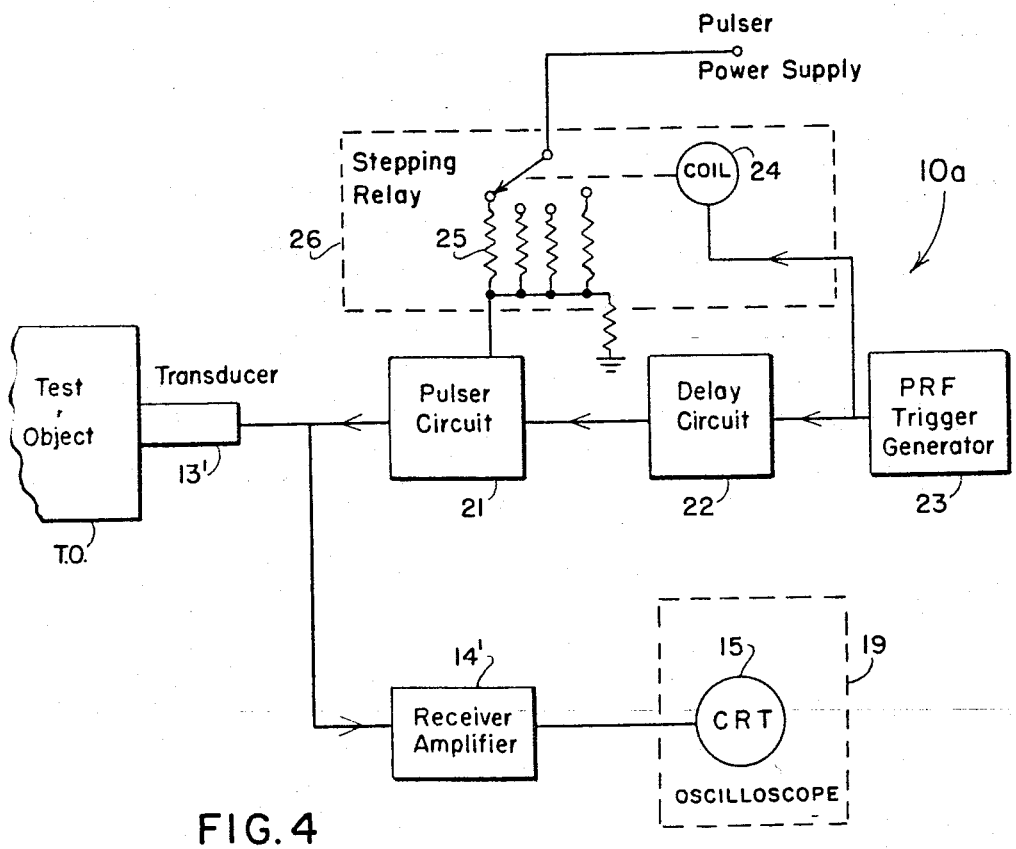
FIGURE 4 is a block diagram of a system illustrating an alternative form of the invention.

FIGURE 4 shows a system 10a embodying an alternative form of the invention. Here, pulses from trigger generator 23, which determines the PRF, are fed to a stepping device, such as a stepping relay 26. This relay has a coil 24 which operates through conventional mechanical means to switch resistors 25, determining the voltage applied to pulser circuit 21. The delay circuit 22 is provided to insure that the switching operation is complete before the pulse occurs. In order to minimize the delay problem one of the electronic counterparts of the stepping relay may be used. One result produced by system 10a is that the pulse power will be reduced by a suitable increment between each pulse. This system represents a case in which the loop gain of the system is varied by changing the pulse power. It is also a synchronous system since the gain is keyed directly to the PRF trigger generator 23. The cycle of loop gain variation is repeated every $m$ pulses where $m$ is the number of steps in the stepping device 26.

The output of pulser circuit 21 is applied to both transducer 13′ and to receiver amplifier 14′. A display of the output of amplifier 14′ is provided on cathode ray tube 15 of oscilloscope 19. Mechanical waves reflected from the test object T.O. are converted by transducer 13′ to electrical pulses and these reflection pulses are applied to receiving amplifier 14′ to produce a display of both the main pulses generated at the PRF by generator 23 as well as the reflected pulses obtained from the test object.

Figure 5:
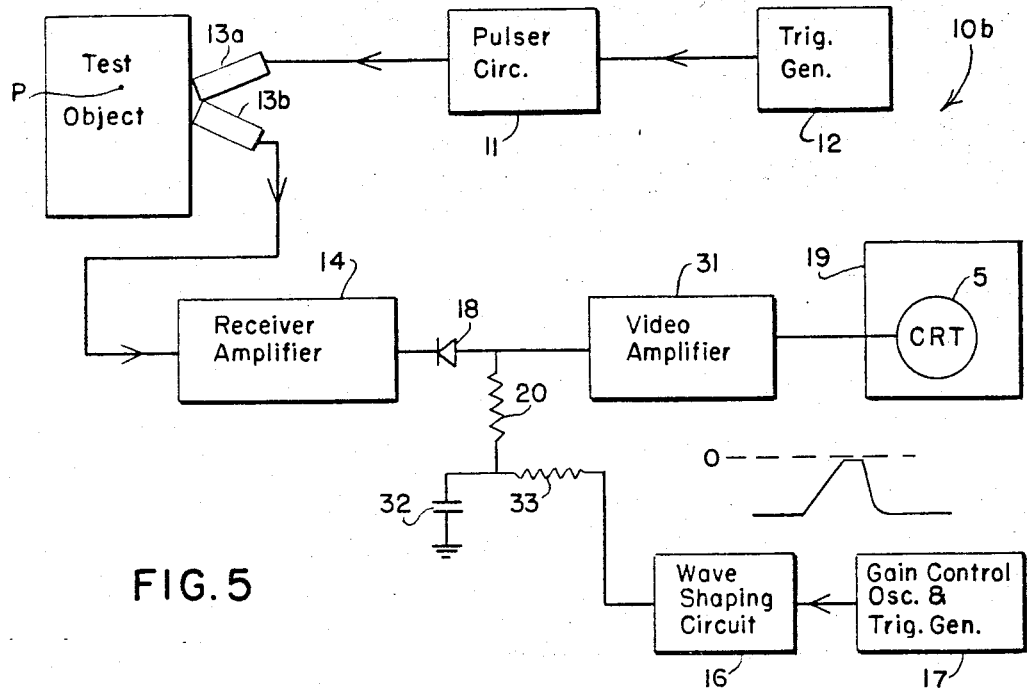
FIGURE 5 is a block diagram of a system illustrating another form of the invention.

FIGURE 5 shows another circuit 10b embodying the invention in which parts corresponding to those of circuits 10 and 10a of FIGURES 1 and 4 are identically numbered. Effective cyclic sensitivity control is achieved by using the gain control voltage to determine clipping level of a base clipping circuit. This type of circuit, manually controlled and sometimes known as "valley clipping," may be used to reject weak signal clutter. FIGURE 5 shows one means of applying the gain control voltage in such a valley clipping system in order to achieve the increase in dynamic range which is the objective of this invention. Diode 18 is a rectifier used with instruments providing a "video" or rectified type of presentation of applied pulses. The gain control waveform W (shown in FIGURE 3) is fed via decoupling circuitry such as series resistor 33 and grounded capacitor 32 to the low potential end of diode load resistor 20. Pulses received by transducer 13b reflected from a point P in test object T.O. are amplified in receiver amplifier 14 and are rectified by diode 18. The variation in the diode reference potential resulting from the application of wave-form W provides the required cyclic change in the system sensitivity. Video amplifier 31 is connected between the rectifier 18 and the cathode ray tube 15 of oscilloscope 19. The wave shaping circuit 16 and gain control oscillator and trigger generator 17 may be the same as indicated in FIGURE 2. Instead of employing the same transducer for applying transmitted pulses to the test object and for receiving the reflected pulses as in circuits 10 and 10a, circuit 10b employs a separate transducer 13a to apply pulses from pulser circuit 11 and trigger generator 12 to the test object T.O. and a separate transducer 13b for receiving the reflected pulses from the test object T.O.

Figure 6:
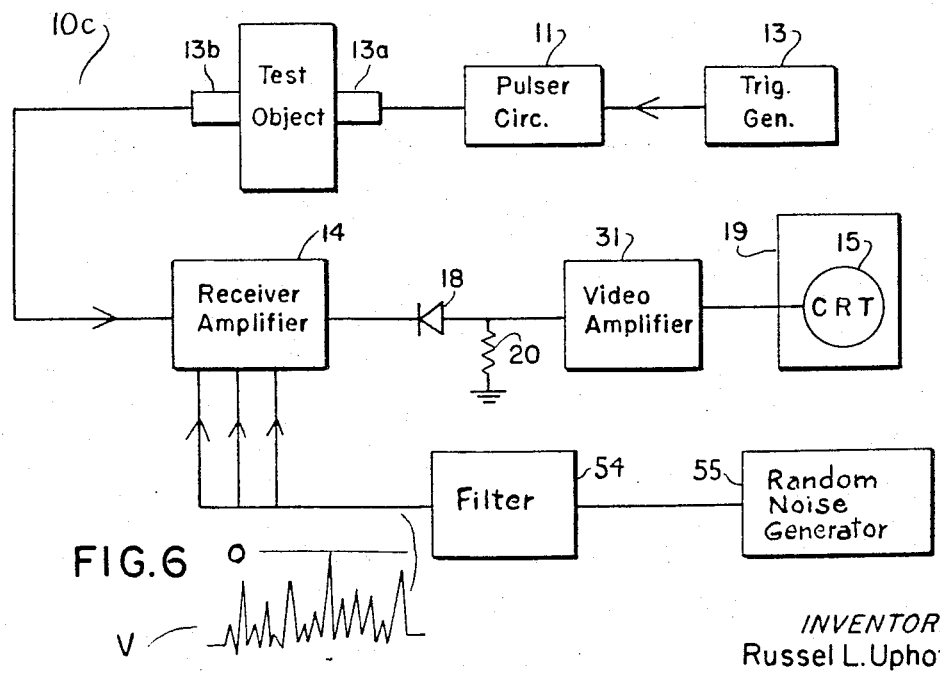
FIGURE 6 is a system illustrating a further alternative form of the invention.

FIGURE 6 shows circuit 10c which is similar to circuit 10b and corresponding parts are identically numbered. In this circuit the pulse transmitting transducer 13a and receiving transducer 13b are on opposite sides of the test object T.O. so that pulses modified or attenuated by the test object are passed to the receiver amplifier 14, instead of reflected pulses as in circuits 10, 10a and 10b. Circuit 10c achieves the objective of the invention through the use of a noncyclic gain control voltage. A Random Noise Generator 55 produces a completely noncyclic output voltage known in the electronic art as "noise" voltage. This voltage is passed through a filter 54 to remove such high frequency components as may be amplified by the receiver amplifier 14. Generally a low pass type of filter would be satisfactory for this purpose. The resulting filtered voltage V is applied to the receiver amplifier 14 in order to achieve the required variation in gain control. The manner of application of the resultant waveform V can be identical to the application of waveform W in FIGURE 1.

Other circuit combinations can be devised to accomplish the objects of the invention. The essential requirement is that when the echogram is complete every element of the picture shall have been scanned by a high loop gain, by a low loop gain, and by at least several and preferably many intermediate values of loop gain. The details of the system will vary considerably depending on the readout device. If a cathode ray tube or memory tube is the final readout device the gain control cycle must be kept short in order to minimize flicker. On the other hand if the echogram is made on photographic film the gain control cycle can be much longer.

The control voltage can be used in combination with other gain control voltages such as those that are commonly used for sensitivity depth control, also known as time control gain or sensitivity time control. The cycled gain control can be applied to systems in which the intensity modulation applied to the cathode ray tube is negative, i.e., strong signals reduce the intensity of the spot, rather than the positive system described. For the purposes of the claims, electro-mechanical pulses or transducers shall be deemed to mean or include electro-acoustic pulses or transducers respectively.

In general, it would be desirable from the standpoint of resolution, to limit the mechanical vibration employed herein to a single one half cycle pulse. However, in practice, it is usually difficult to do this and the acoustical signals, both those being radiated into the test object and those being reflected by interfaces within the test object, consist of wave trains of two to twenty or more cycles. In modern practice it is usual, in displaying these signals, to rectify the wave trains and filter the resulting signal to produce a single "video" pulse. For the purposes of this application the term "pulse" is used to refer not only to video pulses produced in this manner but also to trains of electrical waves within the receiver-amplifier and trains of mechanical vibrations within the test object.

What is claimed is:

1. A device for inspecting solid and fluid objects, comprising in combination:
   an electrical pulse generator for generating pulses at a certain pulse recurrence frequency;
   electro-mechanical transducer means energized by said generator for applying mechanical pulses to the object, for receiving mechanical pulses from said object, and for generating other electrical pulses in response to the received mechanical pulses;
   an electrical pulse amplifier;
   means for applying said other electrical pulses from said transducer means to said amplifier and for applying the first named pulses from said generator to the amplifier;
   and means in circuit with said amplifier for periodically varying the gain of the amplifier at a frequency other than the pulse recurrence frequency or multiples of the pulse recurrence frequency whereby the system gain, or amplitude at the amplifier output, of an echo of each transmitted pulse varies over the period of the modulating frequency.

2. A device for inspecting an object, comprising in combination:
   an electrical pulse generator for generating pulses at a certain pulse recurrence frequency;
   electro-mechanical transducer means energized by said generator for applying mechanical pulses to the object, for receiving reflections of said mechanical pulses from said object, and for generating other electrical pulses in response to the received reflected mechanical pulses;
   an electrical pulse amplifier;
   means for applying said other electrical pulses from said transducer means to said amplifier and for applying the first named pulses from said generator to the amplifier;
   and means in circuit with said amplifier for periodically varying the gain of the amplifier at a frequency other than the pulse recurrence frequency or multiples of the pulse recurrence frequency whereby the system gain, or amplitude at the amplifier output, of an echo of each transmitted pulse varies over the period of the modulating frequency.

3. A device for inspecting an object, comprising in combination:
   an electrical pulse generator for generating pulses at a certain pulse recurrence frequency;
   an electro-mechanical transducer energized by said generator for applying mechanical pulses to the object, for receiving reflections of said mechanical pulses from said object, and for generating other electrical pulses in response to the received reflected mechanical pulses;
   an electrical pulse amplifier;
   means for applying said other electrical pulses from said transducer to said amplifier and for applying the first named pulses from said generator to the amplifier;
   and means in circuit with said amplifier for periodically varying the gain of the amplifier at a frequency other than the pulse recurrence frequency and other than multiples of said pulse recurrence frequency.

4. A device for inspecting an object, comprising in combination:
   an electrical pulse generator for generating pulses at a certain pulse recurrence frequency;
   a plurality of electro-mechanical transducers energized by said generator for applying mechanical pulses to the object, for receiving mechanical pulses from said object, and for generating other electrical pulses in response to the received mechanical pulses;
   an electrical pulse amplifier;
   means for applying said other electrical pulses from said transducers to said amplifier and for applying the first named pulses from said generator to the amplifier;
   and means in circuit with said amplifier for periodically varying the gain of the amplifier at a frequency other than the pulse recurrence frequency and other than multiples of said pulse recurrence frequency.

5. A device for inspecting an object, comprising in combination:
   an electrical pulse generator for generating pulses at a certain pulse recurrence frequency;
   an electro-mechanical transducer energized by said generator for applying mechanical pulses to the object, for receiving reflections of said mechanical pulses from said object, and for generating other electrical pulses in response to the received reflected mechanical pulses;
   an electrical pulse amplifier;
   means for applying said other electrical pulses from said transducer to said amplifier and for applying the first named pulses from said generator to the amplifier;
   and means in circuit with said amplifier for periodically varying the gain of the amplifier at a frequency other than the pulse recurrence frequency and other than multiples and submultiples of said pulse recurrence frequency; said last means comprising,
   oscillator means for generating recurrent electrical pulses at another frequency other than that of said pulse recurrence frequency; and other than multiples and submultiples of said pulse recurrence frequency;
   wave shaping means in circuit with said oscillator means for producing further electrical pulses having amplitudes varying in a manner determined by said wave shaping means at said other frequency;
   and means for applying said further electrical pulses to the amplifier to vary the gain thereof in the manner determined by said wave shaping means at said other frequency while the amplifier receives the first named pulses from said generator and said other electrical pulses from the transducer.

6. A device for inspecting an object, comprising in combination:
   an electrical pulse generator for generating pulses at a certain pulse recurrence frequency;
   an electro-mechanical transducer energized by said generator for applying mechanical pulses to the object, for receiving reflections of said mechanical pulses from said object, and for generating other electrical pulses in response to the received reflected mechanical pulses;

an electrical pulse amplifier;

means for applying said other electrical pulses from said transducer to said amplifier and for applying the first named pulses from said generator to the amplifier;

and means in circuit with said amplifier for periodically varying the gain of the amplifier at a frequency other than the pulse recurrence frequency and other than multiples and submultiples of said pulse recurrence frequency; said last means comprising, oscillator means for generating recurrent electrical pulses at another frequency other than that of said pulse recurrence frequency; and other than that of multiples and submultiples of said pulse recurrence frequency;

wave shaping means in circuit with said oscillator means for producing further electrical pulses having a substantially triangular shape at said other frequency;

means for applying said further electrical pulses to vary the gain thereof in a manner determined by the triangular shape of said further pulses, while the amplifier receives the first named pulses from said generator and said other electrical pulses from the transducer;

and indicating means connected to the amplifier whereby a visual indication of the first named pulses is produced with the amplifier at minimum gain and visual indications of the received reflected pulses are produced with the amplifier at progressively higher gain determined by the triangular shape of said further pulses.

7. A device according to claim 6, wherein said electro-mechanical transducer produces the first named mechanical pulses at a sonic frequency.

8. A device according to claim 6, wherein said electro-mechanical transducer is a piezoelectric device for producing the first named mechanical pulses at a supersonic frequency.

9. In a system for inspecting an object, in combination:

an electrical pulse generator for producing first electrical pulses at a certain pulse recurrence frequency;

an electro-mechanical transducer energized by said pulser circuit for applying mechanical pulses to the object, for receiving reflections of said mechanical pulses from said object and for generating other electrical pulses in response to the received mechanical pulses;

an electrical pulse amplifier;

means for applying said other electrical pulses from said transducer to said amplifier and for applying the first electrical pulses from the pulser circuit to the amplifier;

a power supply for applying power to said pulse generator;

pulse power varying means for varying in discrete steps the magnitude of power applied to the pulse generator;

and stepping means for said pulse power varying means connected to said pulse generator and controlled thereby to step once in synchronism therewith after each pulse produced by the pulse generator, whereby the amplitudes of successive electrical pulses applied to the transducer and amplifier are varied by predetermined discrete increments, and so that loop gain of the system is dependent on and changed by the varying magnitude of power in the successive pulses produced by the pulse generator.

10. A device for inspecting an object, comprising in combination:

an electrical pulser circuit for producing first electrical pulses at a certain pulse recurrence frequency;

an electro-mechanical transducer energized by said pulser circuit for applying mechanical pulses to the object, for receiving reflections of said mechanical pulses from said object, and for generating other electrical pulses in response to the received reflected mechanical pulses;

an electrical pulse amplifier;

means for applying said other electrical pulses from said transducer to said amplifier and for applying the first electrical pulses from said pulser circuit to the amplifier;

a power supply for applying power to said pulse generator;

pulse power varying means in circuit with said power supply and pulser circuit for varying the magnitude of power applied to the pulser circuit for successive pulses during a predetermined period whereby the amplitudes of said first electrical pulses applied to the transducer and amplifier are varied;

and means for controlling said pulse power varying means so that said predetermined power variation recurs at a frequency other than that of said pulse recurrence frequency or integer multiples thereof, whereby the amplitudes of the first electrical pulses are varied at said other frequency in a manner determined by the variation in magnitude of power applied to the pulser circuit.

11. A device for inspecting an object, comprising in combination:

a trigger generator for generating first electrical pulses at a certain pulse recurrence rate;

a pulser circuit;

pulse delay means connected between said generator and pulser circuit;

an electro-mechanical transducer in circuit with said pulser circuit and energized by electrical pulses therefrom at said pulse recurrence frequency for applying mechanical pulses to the object, for receiving reflections of said mechanical pulses from said object, and for generating other electrical pulses in response to the received reflected mechanical pulses;

an electrical pulse amplifier connected to said transducer and pulser circuit;

a power supply for applying power to said pulser circuit;

a multiple-step variable resistance device in circuit with said power supply and pulser circuit for varying in discrete steps the magnitude of power applied to the pulser circuit;

and stepping means for said variable resistance device connected to said trigger generator and controlled thereby to step once in synchronism therewith after each pulse produced by the trigger generator, whereby the amplitudes of successive electrical pulses applied to said transducer and amplifier are varied by predetermined increments, and whereby said delay means delays application of each of the first electrical pulses to the pulser circuit until each step of said stepping means is completed.

12. A device for inspecting an object, comprising in combination:

a trigger generator for generating first electrical pulses at a certain pulse recurrence rate;

a pulser circuit;

an electro-mechanical transducer in circuit with said pulser circuit and energized by electrical pulses therefrom at said pulse recurrence frequency for applying mechanical pulses to the object, for receiving reflections of said mechanical pulses from said object, and for generating other electrical pulses in response to the received reflected mechanical pulses;

an electrical pulse amplifier connected to said transducer and pulser circuit;

a power supply for applying power to said pulser circuit;

a multiple-step variable resistance device in circuit with said power supply and pulser circuit for varying in discrete steps the magnitude of power applied to the pulser circuit;

and stepping means for said variable resistance device connected to said trigger generator and controlled thereby to step once in synchonism therewith after each pulse produced by the trigger generator, whereby the amplitudes of successive electrical pulses applied to said transducer and amplifier are varied by predetermined increments.

13. A device for inspecting an object, comprising in combination:

an electrical pulse generator for generating pulses at a certain pulse recurrence frequency;

electro-mechanical transducer means energized by said generator for applying mechanical pulses to the object, for receiving mechanical pulses from said object and for generating other electrical pulses in response to the received mechanical pulses;

an electrical pulse amplifier;

means for applying said other electrical pulses from said transducer means to said amplifier;

signal generator means for producing a signal of varying amplitude at a frequency of variation other than the pulse recurrence frequency or multiples of the pulse recurrence frequency;

and pulse amplitude clipping means in circuit with said amplifier and said signal generator means for varying the clipping level of pulses applied to said amplifier.

14. A device for inspecting solid and fluid objects, comprising in combination:

an electrical pulse generator for generating pulses at a certain pulse recurrence frequency;

electro-mechanical transducer means energized by said generator for applying mechanical pulses to the object, for receiving mechanical pulses from said object, and for generating other electrical pulses in response to the received mechanical pulses;

an electrical pulse amplifier;

means for applying said other electrical pulses from said transducer means to said amplifier and for applying the first named pulses from said generator to the amplifier;

and noncyclic noise voltage means in circuit with said amplifier for varying the gain of the amplifier.

15. A device for inspecting an object, comprising in combination:

an electrical pulse generator for generating pulses at a certain pulse recurrence frequency;

electro-mechanical transducer means energized by said generator for applying mechanical pulses to the object, for receiving reflections of said mechanical pulses from said object, and for generating other electrical pulses in response to the received reflected mechanical pulses;

an electrical pulse amplifier;

means for applying said other electrical pulses from said transducer means to said amplifier and for applying the first named pulses from said generator to the amplifier;

and noncyclic noise voltage means in circuit with said amplifier for varying the gain of the amplifier.

16. A device for inspecting solid and fluid objects comprising in combination:

an electrical pulse generator circuit for generating pulses at a pulse recurrence frequency;

electro-mechanical transducer means energized by said generator for applying mechanical pulses to the object, for receiving mechanical pulses from said object, and for generating other electrical pulses in response to the received mechanical pulses;

a receiving circuit comprising:

an electrical pulse amplifier;

means for applying said other electrical pulses from said transducer means to said amplifier, said first named pulses being applied to the amplifier; and display means for display of the output of said amplifier;

and modulating means for modulating one of said circuits to vary the amplitude of the output thereof at a modulation frequency other than the pulse recurrence frequency or multiples of the pulse recurrence frequency whereby the system gain, or amplitude at the amplifier output, of an echo of each transmitted pulse varies over the period of the modulating frequency.

17. A device for inspecting solid and fluid objects in accordance with claim 16 wherein said modulation is random.

18. A device for inspecting solid and fluid objects in accordance with claim 16, wherein said modulating means modulates the sensitivity of the receiving circuit.

19. A device for inspecting solid and fluid objects in accordance with claim 16, wherein said modulating means modulates the power of said first named pulses.

References Cited

UNITED STATES PATENTS

| | | | |
|---|---|---|---|
| 2,280,226 | 4/1942 | Firestone | 73—67.8 |
| 2,398,701 | 4/1946 | Firestone | 73—67.9 |
| 3,033,029 | 5/1962 | Weighart | 73—67.8 |

RICHARD C. QUEISSER, *Primary Examiner.*

J. J. GILL, *Examiner.*

J. BEAUCHAMP, *Assistant Examiner.*